United States Patent [19]
Dan et al.

[11] Patent Number: 4,535,976
[45] Date of Patent: Aug. 20, 1985

[54] RUBBER VIBRATION ISOLATORS

[75] Inventors: Takuya Dan; Akio Fujita, both of Yokohama, Japan

[73] Assignee: Bridgestone Tire Co., Ltd., Japan

[21] Appl. No.: 524,188

[22] Filed: Aug. 17, 1983

Related U.S. Application Data

[63] Continuation of Ser. No. 274,568, Jun. 17, 1981, Pat. No. 4,424,960.

[30] Foreign Application Priority Data

Jun. 23, 1980 [JP] Japan .................................. 55-84773
Jul. 12, 1980 [JP] Japan .................................. 55-94565

[51] Int. Cl.³ ............................................. F16F 9/10
[52] U.S. Cl. .................................... 267/8 R; 248/562; 267/63 R; 267/140.1; 267/140.5; 267/141; 267/153
[58] Field of Search .............. 267/8 R, 8 B, 8 C, 8 D, 267/8 A, 9 R, 9 B, 9 A, 9 C, 10, 35, 63 R, 63 A, 64.23, 122, 140, 140.1, 140.2, 140.3, 140.4, 140.5, 141, 141.1, 141.2, 141.3, 141.4, 141.5, 141.6, 141.7, 152, 153, 57.1 R, 57.1 A, 121; 248/562, 565, 636

[56] References Cited

U.S. PATENT DOCUMENTS

| | | | |
|---|---|---|---|
| 1,822,026 | 9/1931 | Guy | 267/63 R |
| 2,502,322 | 3/1950 | Iredell, Jr. | 267/140.1 |
| 2,582,998 | 1/1952 | Lee | 267/140.1 |
| 2,621,923 | 12/1952 | Krotz | 267/57.1 R |
| 2,919,883 | 1/1960 | Murphy | 267/122 |
| 3,642,268 | 2/1972 | Hipsher | 267/57.1 R |
| 3,897,856 | 8/1975 | Pineau | 267/140.3 |
| 3,947,007 | 3/1976 | Pelat | 267/140.4 |
| 4,161,304 | 7/1979 | Brenner et al. | 267/35 |
| 4,199,128 | 4/1980 | Van Den Boom et al. | 248/562 |
| 4,262,886 | 4/1981 | Le Salver et al. | 267/153 |
| 4,424,960 | 1/1984 | Dan et al. | 267/140.1 |

FOREIGN PATENT DOCUMENTS

| | | | |
|---|---|---|---|
| 9120 | 7/1982 | European Pat. Off. | |
| 2639452 | 3/1978 | Fed. Rep. of Germany | 267/35 |
| 2948408 | 6/1981 | Fed. Rep. of Germany | 267/152 |
| 2394715 | 1/1979 | France | 267/35 |
| 2033534 | 5/1980 | United Kingdom | 267/35 |
| 2041485 | 8/1980 | United Kingdom | 267/121 |

Primary Examiner—Bruce H. Stoner, Jr.
Assistant Examiner—Richard R. Diefendorf
Attorney, Agent, or Firm—Sughrue, Mion, Zinn, Macpeak, and Seas

[57] ABSTRACT

A rubber vibration isolator is disclosed, which comprises a pair of upper and lower liquid chambers capable of changing volumes by elastic deformation of an annular rubber elastomer accompanied with longitudinal vibration, a restricted passage for communicating these chambers with each other, at least two liquid chambers formed in the outer periphery of the elastomer and capable of changing volumes accompanied with lateral vibration, and another restricted passage for communicating the latter chambers with each other.

1 Claim, 11 Drawing Figures

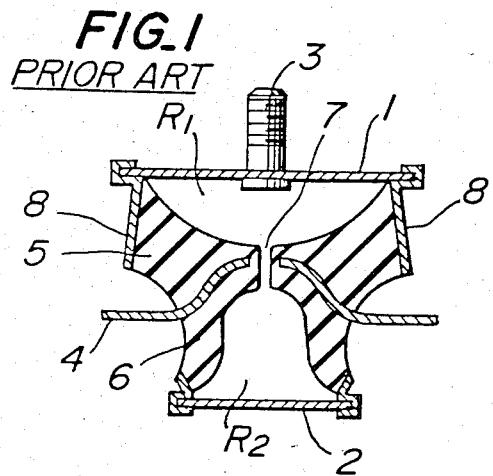
FIG_1 PRIOR ART
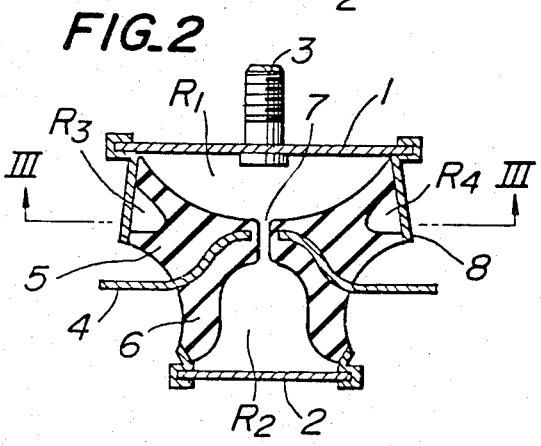
FIG_2
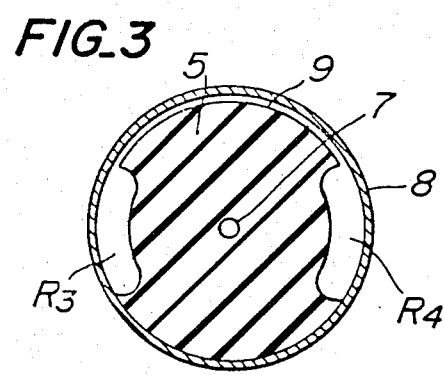
FIG_3

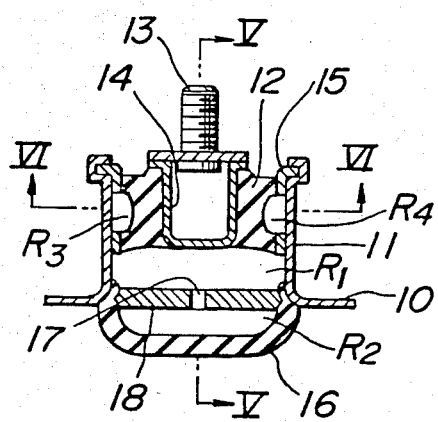
FIG_4
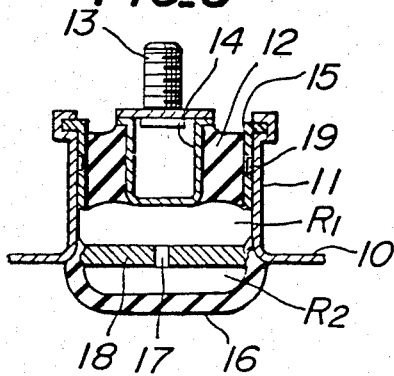
FIG_5
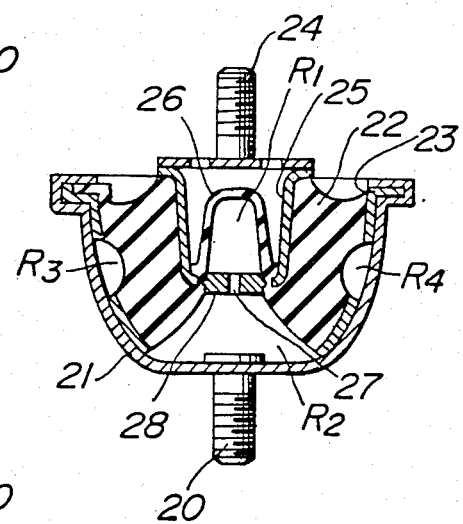
FIG_7
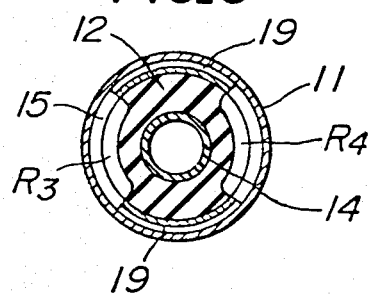
FIG_6

RUBBER VIBRATION ISOLATORS

This is a continuation of application of Ser. No. 274,568, filed June 17, 1981 now U.S. Pat. No. 4,424,960.

This invention relates to rubber vibration isolators, and more particularly to rubber vibration isolators having an improved hydraulic damping performance, which are suitable for use as engine mounts or the like serving to support power units of motor vehicles.

A known rubber vibration isolator for use in engine utilizes the damping action of a liquid. FIG. 1 illustrates an example of such a conventional rubber vibration isolator, wherein upper and lower parts 5, 6 of an annular rubber elastomer are divided by a supporting plate 4 embedded therein. The upper and lower parts are arranged between a pair of upper and lower plates 1, 2 to define a hollow chamber. The upper plate 1 is provided with a stud 3 for supporting a vibrating body such as power unit or the like, while the supporting plate 4 is secured to a vehicle body. Further, the hollow chamber is divided into two upper and lower chambers $R_1$, $R_2$ communicating with each other through a restricted passage or an orifice 7, which is formed by extending the rubber elastomer toward the center thereof to approximately equally divide the hollow chamber into two parts. In each of these chambers $R_1$, $R_2$ an incompressible liquid such as water or the like is placed. In FIG. 1, numeral 8 is an outer sleeve.

According to the rubber vibration isolator of the above mentioned structure, the damping effect of the liquid is developed by cooperating of the upper and lower chambers $R_1$, $R_2$ with the orifice 7 against only up and down vibration or, longitudinal vibration. However, the engine mount is also affected by a lateral vibration in addition to the simple longitudinal vibration. The conventional rubber vibration insolator does not exhibit hydraulic damping performance against the lateral vibration.

It is, therefore, an object of the invention to improve the aforementioned drawback of the prior art and to effectively perform the hydraulic damping against both the longitudinal and lateral vibrations.

According to the invention, a rubber vibration isolator comprises a pair of upper and lower liquid chambers capable of changing volumes by elastic deformation of an annular rubber elastomer accompanied with longitudinal vibration. A restricted passage provides communication between the chambers. At least two liquid chambers capable of changing their volumes accompanied with lateral vibration are formed in an outer periphery of the annular rubber elastomer and communicate with each other through another restricted passage.

The invention will now be described with reference to the accompanying drawings, wherein:

FIG. 1 is a longitudinal sectional view of the conventional rubber vibration isolator as mentioned above;

FIG. 2 is a longitudinal sectional view of an embodiment of the rubber vibration isolator according to the invention;

FIG. 3 is a transverse sectional view taken along the line III—III of FIG. 2;

FIG. 4 is a longitudinal sectional view of another embodiment of the rubber vibration isolator according to the invention;

FIG. 5 is a longitudinal sectional view taken along the line V—V of FIG. 4;

FIG. 6 is a transverse sectional view taken along the line VI—VI of FIG. 4;

FIG. 7 is a longitudinal sectional view of a further embodiment of the rubber vibration isolator according to the invention;

Figure 8:
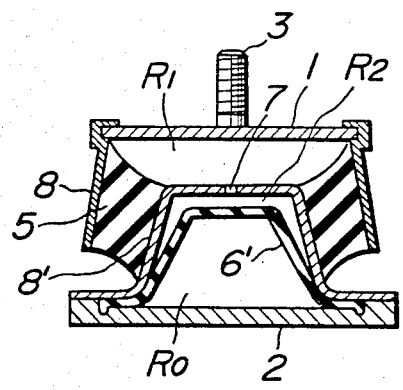
FIGS. 8 and 9 are longitudinal sectional views of still further embodiments of the rubber vibration isolator according to the invention, respectively; and, FIGS. 10-11 are longitudinal and transverse sectional views of a portion of the rubber vibration isolator of FIGS. 4, 5 and 6.

In FIG. 2 is shown a first embodiment of the rubber vibration isolator according to the invention relating to an improvement of the rubber vibration isolator shown in FIG. 1. FIG. 3 shows the transverse section of the rubber vibration isolator taken along the line III—III of FIG. 2. In these figures, like parts are designated by like numerals and like symbols.

The rubber vibration isolator of FIG. 2 has the same structure as shown in FIG. 1 in that the hollow chamber is formed by arranging the annular rubber elastomer (5, 6) between a pair of upper and lower rigid plates 1, 2, divided into two liquid chambers $R_1$, $R_2$ by the orifice 7 for communicating these chambers with each other and filled with incompressible liquid. According to the invention however, two liquid chambers $R_3$, $R_4$ are further formed in the outer periphery of the annular rubber elastomer 5 at symmetrical positions in the circumferential direction thereof and communicate with each other through an annular orifice (or a restricted passage) 9 as shown in FIG. 3.

In the rubber vibration isolator of the above structure as illustrated, longitudinal vibration is damped by the hydraulic damping action based on the flowing of the liquid between the chambers $R_1$ and $R_2$ through the orifice 7, while lateral vibration is damped by the hydraulic damping action based on the flowing of the liquid between the chambers $R_3$ and $R_4$ through the orifice 9. Moreover, the hydraulic damping action against the lateral vibration produces anisotropy by the arrangement of the liquid chambers $R_3$, $R_4$, but in this case, such anisotropy can considerably be mitigated, for example, by biasing the relation in position between the chambers $R_3$ and $R_4$, or by providing an additional liquid chamber at the middle position of the orifice 9.

In the illustrated embodiment, the upper and lower chambers $R_1$, $R_2$ and the right and left chambers $R_3$, $R_4$ communicate through only the separate orifices 7 and 9, but it is a matter of course that these chambers may be in communication with each other through orifices, if necessary.

FIG. 4 shows another embodiment of the rubber vibration isolator according to the invention, wherein an annular rubber elastomer 12 is received in an outer sleeve 11 provided with an annular outer flange 10 extending radially from the sleeve and being secured to a vehicle body, while a cup-type inner sleeve 14 provided with a stud 13 for supporting a vibrating body is forced into the elastomer 12. In this case, an annular ring body 15 is integrally bonded by vulcanization to the outer periphery of the elastomer 12 and fitted into the outer sleeve 11. Further, a bag-like rubber body 16 extends around the lower end of the outer sleeve 11 to define a hollow chamber together with the outer sleeve, annular rubber elastomer, ring body and inner sleeve. The hollow chamber is divided into upper and lower liquid chambers $R_1$, $R_2$ by adheringly joining an orifice plate 18 provided with an orifice 17 to the inner periphery of the outer sleeve 11 near the flange part thereof through the rubber body 16. In particular, left and right liquid chambers $R_3$, $R_4$ are formed in the outer periphery of the rubber elastomer 12 and the ring body 15 at given positions and communicate with each other through orifices 19 formed in the outer periphery of the ring body 15 as shown in FIGS. 5 and 6 showing the sections of FIG. 4 along lines V—V and VI—VI.

Figure 10:
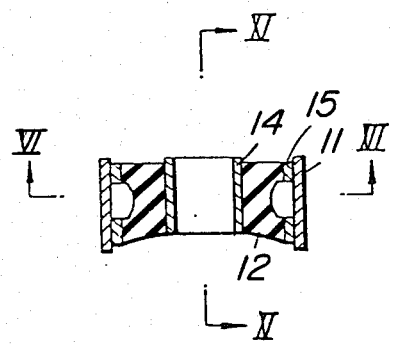
Figure 11:
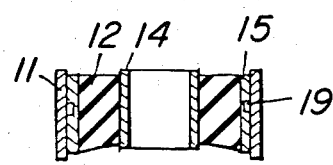

In this embodiment, the performance as a rubber vibration isolator is the same as shown in FIG. 2. Since the orifice 19 communicating the chambers $R_3$, $R_4$ with each other is formed as a groove excavated in the ring body 15 and is limited by the inner periphery of the outer sleeve 11, there is no deviation in the channeling sectional area and length of the orifice 19. Consequently lateral damping performance can be developed in accordance with this invention. FIGS. 10 and 11 illustrate details of the top portion of the isolator structure to show specifically the formation of the orifices 19 in the ring body 15.

FIG. 7 illustrates a further embodiment of the rubber vibration isolator according to the invention, wherein an annular rubber elastomer 22 is received in the inside of a cup-type rigid body 21 provided at its bottom with a stud 20 to be secured to a vehicle body. In this case, an annular ring body 23 is integrally bonded by vulcanization to the outer periphery of the rubber elastomer 22 and is fitted into the rigid body 21 in the same manner as described in FIG. 4. Further, an inner sleeve 25 provided at its top with a stud 24 to be secured to a vibrating body is forced into the inner periphery of the rubber elastomer 22. Also, a bag-like rubber body 26 is arranged inside the inner sleeve 25 and integrally bonded thereto (in the illustrated embodiment, the rubber body 26 is integrally bonded to a part of the rubber elastomer 22). Then, a hollow chamber defined by the rubber body 26, the rubber elastomer 22 and the rigid body 21 is divided into upper and lower liquid chambers $R_1$, $R_2$ by fitting an orifice plate 28 provided with an orifice 27 to the inner periphery of the inner sleeve 25 near the lower end thereof to provide communication between these chambers through the orifice 27. According to the invention, plural liquid chambers $R_3$, $R_4$ . . . are formed in the outer periphery of the rubber elastomer 22 and the ring body 23 at given positions and communicate with each other through an orifice (not shown) having the same structure as shown in FIGS. 5 and 6.

In FIG. 8 is shown a preferred embodiment of the rubber vibration isolator according to the invention utilizing hydraulic damping performance, which is particularly related to an improvement of the rubber vibration isolator previously set forth herein. In this case, an outer sleeve 8 and an inner sleeve 8' are secured to outer and inner peripheral surfaces of an annular rubber elastomer 5, respectively. The inner sleeve 8' has an inverted cup shape, the bottom of which is provided with an orifice 7. The rubber elastomer 5 and the inner sleeve 8' form an upper liquid chamber $R_1$ with an upper rigid plate 1 secured to the outer sleeve 8. Inside the inner sleeve 8' is arranged an inverted cup-shaped rubber body 6' to define a lower liquid chamber $R_2$. Its lower end is secured to the inner sleeve 8' by means of a lower rigid plate 2. Moreover, a pressurized gas is enclosed in a closed hollow space $R_0$ defined between the rubber body 6' and the lower plate 2 as shown in FIG. 8, whereby a favorable damping performance can further be developed. That is, in the rubber vibration isolator of FIG. 8, the rubber body 6' functions toward its folding direction without being subjected to a tension under the vibration loading.

Figure 9:
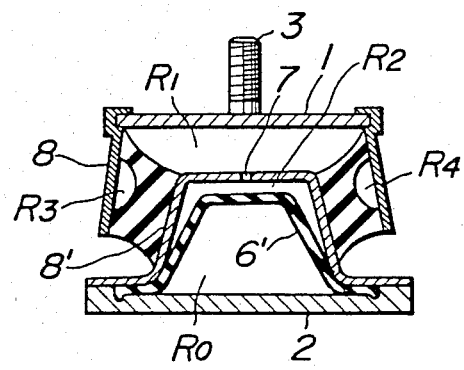

In FIG. 9 is shown a modified embodiment of the rubber vibration isolator illustrated in FIG. 8, wherein liquid chambers $R_3$, $R_4$ are formed in the outer periphery of the rubber elastomer 5 facing the outer sleeve 8 and communicate with each other through an orifice (not shown) in the same manner as previously mentioned.

According to this illustrated embodiment, both the longitudinal and lateral damping performances are simultaneously developed. Also, even if the rubber body 6' is broken down, the liquid filled in the liquid chambers $R_1$, $R_2$ flows into only the hollow space $R_0$ and does not leak out of the liquid chamber. In this case, vibration loading can be borne by only the rubber elastomer 5. Therefore, the rubber vibration isolator of FIG. 9 is excellent in security.

As explained above, the rubber vibration isolator according to the invention makes it possible to develop proper damping performance against both the longitudinal and lateral vibrations and is very wide in its range of application.

What is claimed is:

1. A rubber vibration isolator comprising: an inner sleeve, an annular rubber elastomer, an annular metal ring body and a metal outer sleeve; said annular rubber elastomer being inserted between said inner sleeve and said annular ring body and integrally bonded to both said inner sleeve and said annular ring body, said rubber elastomer provided at its outer circumference with plural recesses separated from each other by said rubber elastomer, and said annular ring body being fitted into said outer sleeve so as to form a metal contact therebetween and being provided with plural holes corresponding to said recesses and with fine grooves formed in the outer periphery thereof by cutting to define restricted passages together with the inner surface of said outer sleeve establishing communication between said holes and between said recesses, and said recesses, holes and fine grooves being filled with an incompressible liquid.

* * * * *